Figure 1:
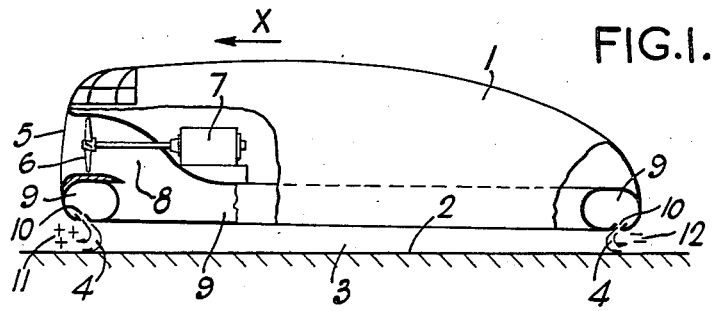

Jan. 14, 1964  C. S. COCKERELL  3,117,645
GROUND EFFECT VEHICLE WITH CURTAIN REINFORCING MEANS
Filed April 12, 1961  2 Sheets-Sheet 1

Inventor
C. S. COCKERELL
By Cameron, Kerkam & Sutton
Attorneys

United States Patent Office 3,117,645
Patented Jan. 14, 1964

3,117,645
GROUND EFFECT VEHICLE WITH CURTAIN
REINFORCING MEANS
Christopher Sydney Cockerell, Lymington, England, assignor to Hovercraft Development Limited, London, England, a British company
Filed Apr. 12, 1961, Ser. No. 102,446
Claims priority, application Great Britain Apr. 13, 1960
7 Claims. (Cl. 180—7)

This invention relates to vehicles for travelling over land/or water, the vehicle being at least partly supported above the surface over which is operates by a cushion of pressurised fluid, the cushion being at least partially formed and contained beneath the vehicle by a fluid curtain formed by fluid issuing from a port or ports formed in the bottom of the vehicle.

When, in such a vehicle, the cushion is contained at the front and rear by fluid curtains, instability is likely to occur when the vehicle is moving forward, as a pressure, due to such movement, is built up in front of the front curtain, hereinafter referred to as the front primary curtain. A lowering of the atmospheric pressure occurs immediately behind the rear curtain, hereinafter referred to as the rear primary curtain. The effect is to strengthen the front primary curtain and weaken the rear primary curtain, which in turn results in a local increase in cushion pressure at the front of the vehicle and a local decrease in cushion pressure at the rear of the vehicle. A "nose-up" attitude of the vehicle will thus occur, generally accompanied by pitching.

These undesirable effects can be eased to some extent by strengthening the rear primary curtain, preferably progressively, as the forward speed of the vehicle increases, and it is a feature of this invention that there is provided a vehicle which is at least partly supported by a cushion of pressurised gas, which is contained at the rear of the vehicle by a curtain of fluid, the rear curtain being reinforced by further curtain forming fluid entering a forward facing intake on the top of the vehicle, the fluid being fed therefrom to a port or series of ports situated adjacent to and substantially parallel to and outside of the port or ports through which issues the fluid forming the rear curtain.

Although the provision of a reinforcing curtain of fluid counter-balances to a considerable extent the weakening of the rear primary curtain and thus reduces the degree of local cushion pressure decrease which occurs at the rear, there is still a local increase in cushion pressure at front due to the effective strengthening of the front primary curtain. This effect can be reduced by weakening the front primary curtain and it is a further optional feature of the invention that in addition to the reinforcement of the rear curtain, the mass flow of the fluid forming the front primary curtain may be varied, the mass flow decreasing as the forward speed of the vehicle increases.

Depending upon the plan form of the vehicle, the lowering of the pressure which occurs outside the rear curtain, may also extend along the sides of the vehicle and where this is so, the curtain at these parts may also be reinforced by further curtain forming fluid entering forward facing intakes which fluid is fed to a port or series of ports adjacent to and substantially parallel to those parts of the curtains it is intended to reinforce.

Figure 2:
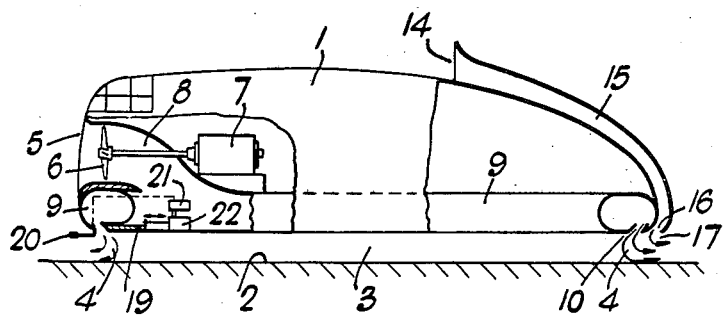
Figure 3:
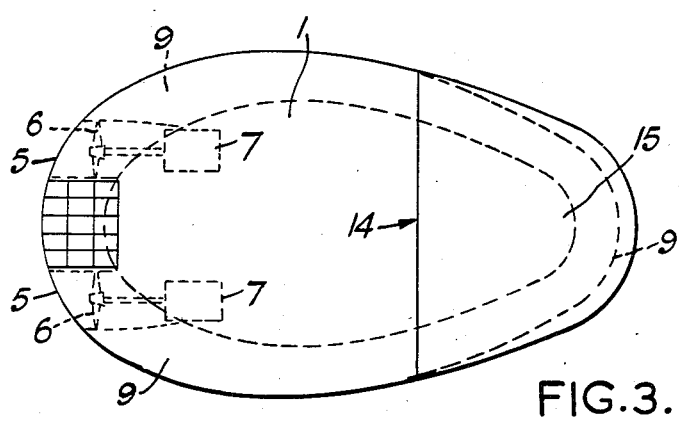
Figure 4:
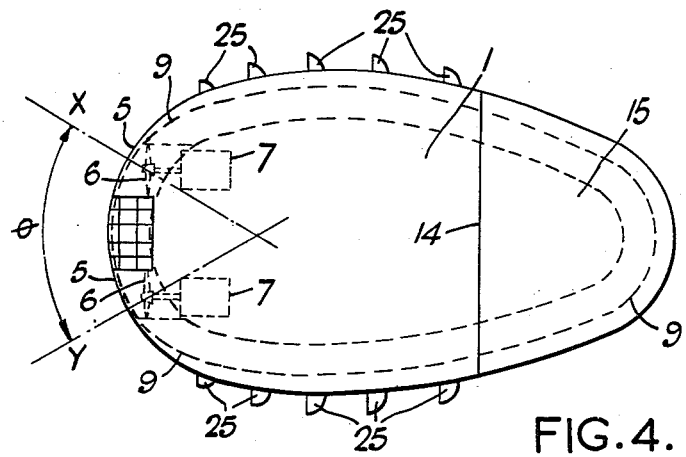
Figure 5:
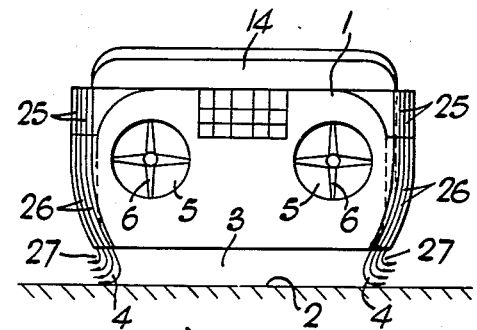
Figure 6:
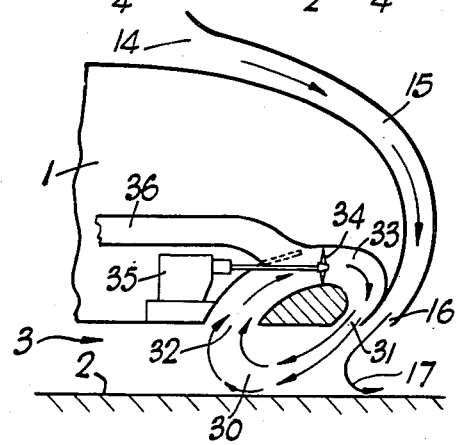

The invention will be readily understood from the following description of certain embodiments, by way of example, in conjunction with the accompanying drawings, in which:

FIGURE 1 is a side view, partly in vertical cross-section on the fore and aft axis, of a vehicle which does not embody the invention, FIGURE 2 is a side view, partially in vertical cross-section on the fore and aft axis, of a vehicle, similar to that shown in FIGURE 1, illustrating one embodiment of the invention, FIGURE 3 is a plan view of the vehicle illustrated in FIGURE 2, FIGURE 4 is a plan view, similar to that of FIGURE 3, illustrating a further embodiment of the invention, FIGURE 5 is a front elevation of the vehicle illustrated in FIGURE 4, and FIGURE 6 is a vertical cross-section of the rear part of a vehicle similar to that illustrated in FIGURE 2, showing an alternative form of fluid curtain formation.

In FIGURE 1 there is illustrated, in vertical cross-section, a normal form of vehicle. The vehicle 1 is supported over the surface 2 by a cushion of pressurised air in the space 3, the cushion being formed and maintained at least partly by an air curtain 4. The air curtain 4 is formed by air drawn in through intakes 5, situated at the front of the vehicle by propellers 6 driven by engines 7. The air flows via a duct 8 to a supply duct 9 formed in the bottom of the vehicle, adjacent to the periphery thereof. The air is ejected through a supply port 10 formed in the bottom of the supply duct 9. Hereinafter this curtain is referred to as the primary curtain.

As the vehicle is propelled forwards, as indicated by the arrow X, a pressure will build up at 11 ahead of the front portion of the primary curtain 4. This has the effect of strengthening the front portion of the primary curtain as for a given strength of curtain the pressure drop from the inside of the curtain to the outside is constant, and any increase in the external pressure results in a similar increase of the cushion pressure locally, adjacent to the curtain. An increase in lift thus occurs at the front of the vehicle. At the rear of the vehicle a reduction in pressure occurs immediately behind the rear portion of the primary curtain at 12. This has the effect of weakening the rear primary curtain, as again for a predetermined strength of curtain the pressure drop the curtain can support is constant and thus lowering of the pressure external of the rear primary curtain produces a local reduction of the cushion pressure, a local reduction in lift occurring. Due to the local increase in cushion pressure at the front and the local decrease at the rear, the vehicle adopts a nose-up attitude which may be accompanied by pitching.

If the rear primary curtain is strengthened by increasing its mass flow some easing of this difficulty will be obtained but at the expense of increased power. In FIGURES 2 and 3, when the vehicle is moving forward, air enters a forward facing intake 14, positioned on the top of the vehicle, at the rear. Air entering the intake is fed via a duct 15 down the rear of the vehicle to a port 16 formed across the bottom of the vehicle outside and immediately adjacent to the rear portion of the supply port 10. The air issues from the port 16 and forms a reinforcing curtain 17, the rear primary curtain 4 and the reinforcing curtain 17 forming one combined air curtain. The stagnation pressure of the air at the intake 14 will increase as the vehicle speed increases, the mass flow of air forming the reinforcing curtain 17 and thus the strength of the curtain also increasing. As the pressure reduction at the rear of the vehicle also depends upon the forward speed of the vehicle, the pressure reducing to a lower value as the speed increases, the increase in strength of the reinforcing curtain with forward speed acts to offset the pressure reduction, without any substantial increase in power requirements.

The effective increase in strength of the front primary curtain can be offset, to any required degree, by reducing the mass flow of the air forming the curtain. Preferably this is done gradually, in accordance with speed, and conveniently can be carried out automatically under the control of a valve 19 or the like operated in accordance with some parameter which varies with the forward speed of the vehicle, or in accordance with variation of the pressure of the cushion immediately inside the front curtain. For example, the stagnation pressure immediately outside the curtain increases with an increase in the forward speed of the vehicle. This stagnation pressure can be sensed by a sensing head 20 connected to a control valve 21 and servo device 22, to operate the valve 19 in substantially the same manner as that in which the flexible duct 90 is operated in the structure illustrated in FIG. 16 of applicant's co-pending application Serial No. 837,502, filed September 1, 1959, and the corresponding French Patent No. 1,238,499.

As stated above the pressure decrease which occurs outside the rear curtain may extend along the sides of the vehicle also. FIGURES 4 and 5 illustrate a vehicle substantially as shown in FIGURES 1 to 3. When the vehicle is moving forwards, as described above, a pressure above atmospheric builds up at the front of the vehicle. This pressure build-up extends over the portion of the periphery between the lines X and Y. The pressure outside the curtain for the remainder of the periphery of the vehicle is below atmospheric and thus tends to decrease the effective strength of the curtain. The positions of the transition points, that is the lines X and Y, vary with the plan form of the vehicle and are the points at which the flow of air created by the movement of the vehicle is tangential to the profile. For plan forms having a constant radius at the front, the angle $\theta$ subtended between the lines X and Y is approximately 60°. The transition positions are liable to be varied by other factors such as wind. A forward facing intake 14 positioned across the top of the vehicle near the rear end as in FIGURES 2 and 3 supplies air to strengthen the curtain round the rear end of the vehicle. Additional forward facing intakes 25 are positioned along the sides of the vehicle to provide air for strengthening the curtain along the sides of the vehicle. The air entering the intakes 25 flows down ducts 26 down the side of the vehicle, the air finally issuing from a port formed outside and adjacent to the supply port 10. A reinforcing curtain 27 is thus formed outside the primary curtain 4, along the sides of the vehicle, the two air curtains merging to form one combined air curtain.

FIGURE 6 illustrates a modification of the vehicle illustrated in FIGURE 2, in which the primary curtain is of the form in which at least part of the curtain forming air is recovered. The air forming the primary curtain 30 issues from a supply port 31. The air flows downwards and inwards from the supply port and is deflected round and upwards by the cushion. The air then flows into a recovery port 32 formed in the bottom of the vehicle slightly inboard of the supply port. From the recovery port the air flows through a transfer duct 33 back to the supply port 31, being re-energised by a series of fans 34 driven by engines 35.

Air for starting, and for supplying additional air during normal operation, is supplied via a duct 36 from any suitable source.

I claim:

1. A vehicle of the type which, in operation, is at least partly supported above the surface over which it operates by a cushion of pressurised gas, comprising cushion containing means including a supply port formed in the bottom of the vehicle at the rear thereof, means for forming a curtain of fluid which issues from said supply port and contains the cushion at the rear of the vehicle including a first fluid intake and duct means connecting said first intake to said supply port, and means for reinforcing said curtain comprising a forward facing second air intake mounted on top of the vehicle, an air discharge port formed in the bottom of the vehicle outside of and adjacent to said supply port, and duct means for feeding air from said second intake to said discharge port.

2. A vehicle of the type which, in operation, is at least partly supported above the surface over which it operates by a cushion of pressurised gas, comprising cushion containing means including supply ports formed in the bottom of the vehicle at the front and rear thereof, means for forming curtains of fluid which issue from said supply ports and contain the cushion at the front and rear of the vehicle including a fluid intake and duct means connecting said fluid intake to said supply ports, means responsive to variations in the forward speed of the vehicle for varying the mass flow of the fluid forming the front curtain, and means for reinforcing the rear curtain comprising a forward facing air intake mounted on top of the vehicle, an air discharge port formed in the bottom of the vehicle outside of and adjacent to the rear curtain supply port, and duct means for feeding air from said air intake to said discharge port.

3. A vehicle of the type which, in operation, is at least partly supported above the surface over which it operates by a cushion of pressurised gas, comprising cushion containing means including a supply port formed in the bottom of the vehicle and extending around the periphery thereof, means for forming a curtain of fluid which issues from said supply port and contains the cushion round the periphery of the vehicle including a fluid intake and duct means connecting said fluid intake to said supply port, means for reinforcing those portions of the curtain at the rear and along the sides of the vehicle comprising a forward facing air intake mounted on top of the vehicle, a plurality of further forward facing air intakes mounted along the sides of the vehicle, a plurality of air discharge ports formed in the bottom of the vehicle outside of and immediately adjacent those portions of the supply port through which issues the fluid forming the rear and the side portions of the curtain, and duct means for feeding air from said air intakes to said discharge ports.

4. A vehicle of the type which, in operation, is at least partly supported by a cushion of pressurised gas, comprising cushion containing means including a supply port at the rear of the vehicle, means for forming a rear curtain of fluid which issues from said supply port and contains the cushion at the rear of the vehicle including a first fluid intake and duct means connecting said first intake to said supply port, and means for reinforcing said rear curtain including a forward facing second fluid intake on the top of the vehicle, at least one fluid discharge port situated adjacent to and substantially parallel to and outside of said supply port, and means for feeding fluid from said second intake to said discharge port.

5. A vehicle as claimed in claim 4 wherein the cushion containing means includes a supply port at the front of the vehicle also connected to said first fluid intake, means for forming a front fluid curtain which issues from said front supply port and contains the cushion at the front of the vehicle, and means for varying the mass flow of the fluid forming said front curtain.

6. A vehicle of the type which, in operation, is at least partly supported by a cushion of pressurised gas, comprising cushion containing means including a supply port extending across the front and rear of the vehicle and along the sides thereof, means for forming a curtain of fluid which issues from said supply port and contains the cushion round the periphery of the vehicle including a first fluid intake and duct means connecting said first intake to said supply port, means for reinforcing the portion of said curtain at the rear of the vehicle including at least one fluid discharge port situated adjacent to and substantially parallel to and outside of the portion of said supply port at the rear of the vehicle, a forward facing second fluid intake on the top of the vehicle, means for feeding fluid from said second intake to said discharge port, further forward facing intakes situated on the top of the vehicle, further discharge ports situated adjacent to and substantially parallel to and outside of those portions of the supply port which extend along the sides of the vehicle, and means for feeding fluid from said further intakes to said further discharge ports.

7. A vehicle as claimed in claim 6 wherein said further ports extend along those portions of the sides of the vehicle over which a negative stagnation pressure occurs when the vehicle is moving forward.

References Cited in the file of this patent

FOREIGN PATENTS

| | | |
|---|---|---|
| 219,133 | Australia | Nov. 24, 1958 |
| 1,238,499 | France | July 4, 1960 |